United States Patent [19]

Young et al.

[11] Patent Number: 5,423,008
[45] Date of Patent: Jun. 6, 1995

[54] APPARATUS AND METHOD FOR DETECTING THE ACTIVITIES OF A PLURALITY OF PROCESSORS ON A SHARED BUS

[75] Inventors: Desmond W. Young, Campbell; Kianoosh Naghshineh, Menlo Park; William D. Schwaderer, San Jose, all of Calif.

[73] Assignee: Silicon Graphics, Inc., Mountain View, Calif.

[21] Appl. No.: 924,189

[22] Filed: Aug. 3, 1992

[51] Int. Cl.6 .................. G06F 12/16; G06F 12/06
[52] U.S. Cl. ........................... 395/325; 364/228.3; 364/228.1; 364/240.1; 364/246.6; 364/DIG. 1
[58] Field of Search ............... 395/325, 725, 200, 400, 395/425, 775; 370/60; 340/825.52

[56] References Cited

U.S. PATENT DOCUMENTS

| | | | |
|---|---|---|---|
| 3,618,040 | 11/1971 | Iwamoto et al. | 395/425 |
| 4,142,234 | 2/1979 | Bean et al. | 395/425 |
| 4,151,592 | 4/1979 | Suzuki et al. | 395/325 |
| 4,404,628 | 9/1983 | Angelo | 395/200 |
| 4,420,806 | 12/1983 | Johnson, Jr. et al. | 395/725 |
| 4,485,438 | 11/1984 | Myrmo et al. | 395/325 |
| 4,503,498 | 3/1985 | Antonov et al. | 395/725 |
| 4,742,452 | 5/1988 | Hirokawa | 395/325 |
| 4,763,247 | 8/1988 | Borovski et al. | 395/325 |
| 4,847,804 | 7/1989 | Shaffer et al. | 395/425 |
| 4,864,533 | 9/1989 | Hamada | 395/425 |
| 4,882,705 | 11/1989 | Yasue | 395/575 |
| 4,930,070 | 5/1990 | Yonekura et al. | 395/725 |
| 5,073,871 | 12/1991 | Uchida et al. | 395/425 |
| 5,136,714 | 8/1992 | Braudaway et al. | 395/725 |
| 5,175,836 | 12/1992 | Morgan | 395/425 |
| 5,202,972 | 4/1993 | Gusefski et al. | 395/425 |
| 5,237,694 | 8/1993 | Horne et al. | 395/725 |
| 5,313,620 | 5/1994 | Cohen et al. | 395/550 |
| 5,321,825 | 6/1994 | Song | 395/425 |
| 5,327,538 | 7/1994 | Hamaguchi et al. | 395/325 |

*Primary Examiner*—Gopal C. Ray
*Attorney, Agent, or Firm*—Albert C. Smith; Phong K. Truong

[57] ABSTRACT

A high performance shared-bus signal detection mechanism comprises a plurality of access event registers, an address comparator, an event masking component, and a local processor access detector. The comparator component couples to a bus providing access to a shared memory address space. The bus can be used by a single processor or shared by a plurality of processors. A processor loads the address event registers with address base and extent values and type of access notification desired. As addresses and access-type signals appear on the bus, the comparator simultaneously compares the bus information to access event register information to determine if the bus access meets access event register criteria. When matches occur, the comparator emits an appropriate signal to an event masking component. The local processor also loads the event masking component to selectively mask off unwanted event notifications as well as those performed by itself. The event masking component emits signals which feed a general-purpose or special-purpose processors such as interrupt controllers.

19 Claims, 7 Drawing Sheets

APPARATUS AND METHOD FOR DETECTING THE ACTIVITIES OF A PLURALITY OF PROCESSORS ON A SHARED BUS

BACKGROUND OF THE INVENTION

1. Field of the Invention

The present invention relates to the field of computer designs with one or more processors coupled by a bus for signaling.

2. Description of Related Art

Traditional computer designs typically incorporate one or more general-purpose programmable processors, and a variety of specialized processors whose capabilities are restricted to specific functions. Specialized processors conserve general-purpose processor resources by performing specific functions generalized processors would otherwise be required to perform.

An example of a specialized processor in the prior art is an interrupt controller that prioritizes and presents a plurality of interrupt requests to a general-purpose processor. General-purpose processors often select the precise scheme their interrupt controllers use by presenting configuration information to the interrupt controller's Input/Output ports. Therefore, the general-purpose processor programs the interrupt controller's processing behavior such as presenting interrupts on a strict priority or round-robin basis. In the most fundamental sense, such interrupt controllers represent specialized processors whose functions are restricted to specific programmable functions.

In addition to a multiplicity of specialized processors, computer system architects increasingly incorporate multiple general-purpose processors in their designs. This helps escape processing limitations of a single general-purpose processor. One way additional general-purpose processors are included is through a design's provision for intelligent adapter cards. Intelligent adapter cards may contain both general-purpose adapter processors and specialized processors that collect or manipulate data before passing it to a general-purpose processor.

Alternately, computer system architects may include multiple general-purpose processors that collectively process information. Finally, computer system architects may include both multiple general-purpose processors and intelligent adapter cards in a design.

In any of these approaches, architects necessarily include provisions for synchronizing the various processors. Specifically, architects must pay particular attention to the mechanisms a plurality of processors use to synchronize and communicate activities. As an example, multiple processors that share a common data memory must detect when other processors change data values stored in the memory. This allows processors to invalidate their caches, causing a subsequent cache refresh for the data item's changed value when it is needed. Cache updates occur at a hardware level and are transparent to a processor's software. Such hardware cache-coherency considerations are well documented in John L. Hennessy's and David A. Patterson's *Computer Architecture A Quantitative Approach* published by Morgan Kaufmann Publishers Inc., 1990.

Other multi-processor synchronization and communication techniques involve semaphores and work queues. Since both the semaphore and queue approaches require a shared memory, they are hereafter collectively considered as shared address space control structures. Software manipulation of shared address space control structures are well known and representative of multi-processor synchronization state-of-the-art despite their potential to present significant performance problems. In such approaches, shared address space control structures reside at agreed-upon, known addresses and processors manipulate them under software control. It is desirable that when processors access these structures, other processors learn of the access selectively in a non-disruptive manner though this is often difficult if not impossible under software control.

Computer designers currently approach independent processor signaling with a variety of well known and understood software approaches. However, these approaches are not efficient, and unnecessarily consume precious processor resources. Non-disruptive hardware signaling is largely restricted to cache coherency applications.

Techniques that improve processor-to-processor communication efficiency are of great commercial importance because they allow lower-cost processors and components to perform work that previously required the use of higher-cost processors and components. Increased efficiency, therefore, leads directly to computer system designs that have lower costs, improved performance, or both. Thus, there is a need for a system and a method to improve processor-to-processor communication and signaling.

SUMMARY OF THE INVENTION

The present invention includes methods and apparatuses that overcome the problems of efficient, non-disruptive bus-signaling between processors. These methods and apparatuses provide significant solutions to the signaling speed and efficiency challenges presented by high-performance signaling between processors.

In the preferred embodiment, the bus signal detection mechanism comprises a plurality of access event registers, an address comparator, an event masking component, and a local processor access detector. The bus-signal detection mechanism is coupled between the system bus and a local bus. The bus signal detection mechanism is also coupled to a general processor and a special purpose processor. The access event registers are coupled to the local bus to receive and store addresses, ranges and activities that are of interest. The address comparator is coupled to the system bus and the output of the event registers. The address comparator compares the address on the bus to the values loaded in the event registers. If there is a match, event occurred signals are produced and sent to the event masking component coupled to the comparator and the bus. The event occurred signals are masked and then sent to the general processor, and special processor. The bus signal detection system also includes a processor access detector that disables the comparator when its associated processor is accessing the shared memory.

A preferred embodiment of the method of the present invention comprises the steps of: loading address event registers with address base and extent values and type of access notification desired; comparing the addresses and access-type signals that appear on the bus during bus address cycles to access event register information for a match; producing an appropriate signal when matches occur, and sending the signal to an event masking component; loading the event masking component to selectively mask off unwanted event notifications as well as those performed by itself; and producing and sending masked event signals to the general purpose or specialized processors.

DETAILED DESCRIPTION OF THE PREFERRED EMBODIMENTS

Figure 1:
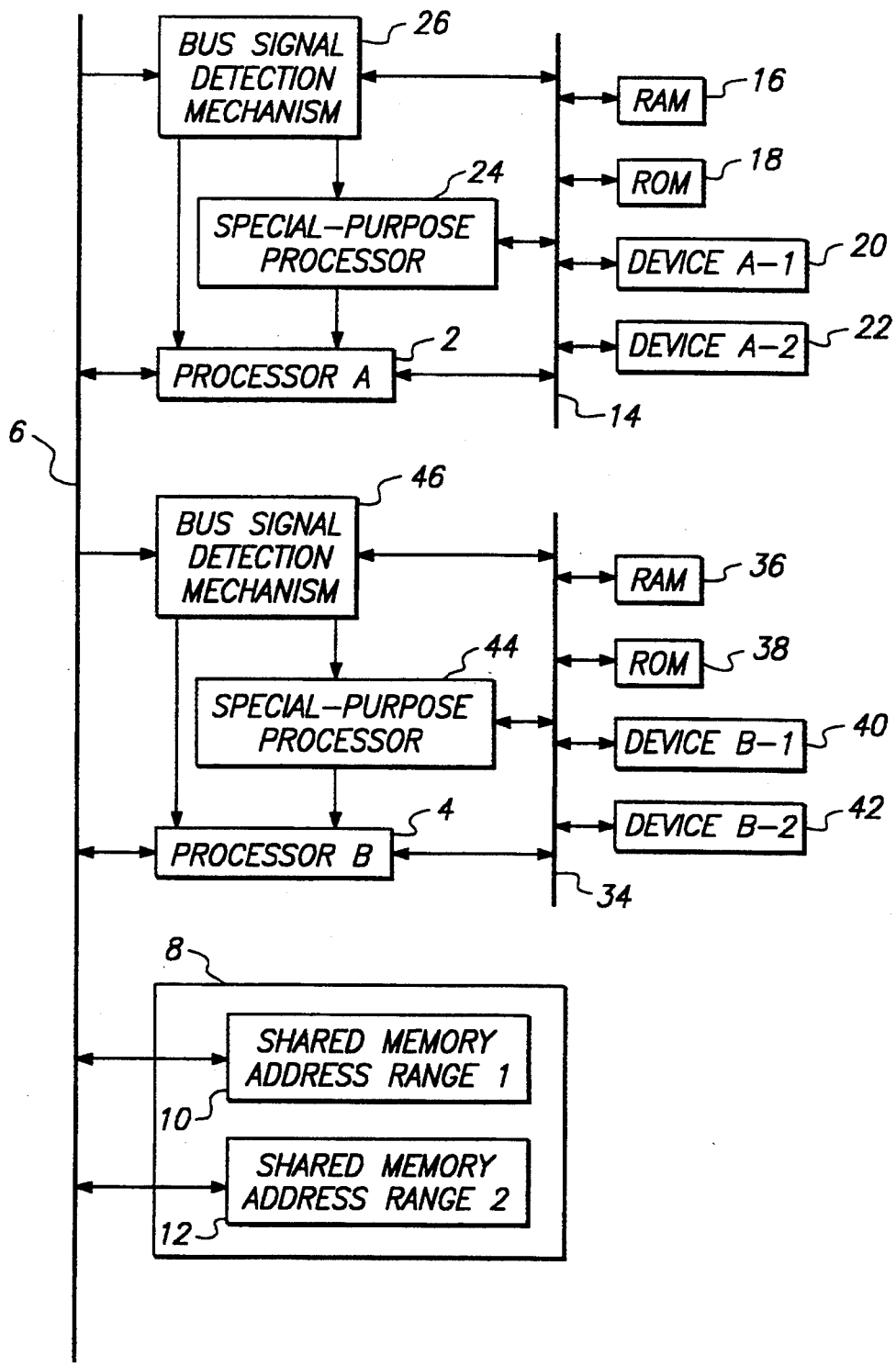
FIG. 1 is a block diagram of a two-processor system including a preferred embodiment of a bus signal detection mechanisms of the present invention.

FIG. 1 shows a system configuration comprising two processors, processor A 2 and processor B 4. Both processors 2, 4 are coupled to and use a shared system bus 6 to access a shared memory 8. The shared memory 8 comprises a single, contiguous address space that has corresponding Random Access Memory (RAM) responding to the entire address range of the address space. In the preferred embodiment, the RAM address space is the shared system memory address space, but other address spaces are possible. Examples would include hard disk sector address spaces and Input/Output port address spaces.

In addition, individual shared system memory RAM address spaces may be partitioned into multiple address ranges which individually have optional RAM memory present in those locations. The RAM can comprise a combination of Dynamic Random Access Memory (DRAM), static RAM, Read Only Memory (ROM), or other address space implementations. In the preferred embodiment of FIG. 1, the shared memory 8 is DRAM, and includes two shared memory address ranges 10, 12.

In the preferred embodiment, the shared memory 8 has permissible address space values on the shared system bus 6 that are 32-bit values. They range from the hexadecimal value 0x00000000 to hexadecimal value 0xFFFFFFFF. In the preferred embodiment, DRAM memory is only available at address locations 0x00000000 to 0x00FFFFFF. Therefore, in FIG. 1, shared memory address range 1 10 would have address values from 0x00000000 to 0x00FFFFFF and DRAM responding to those addresses. Shared memory address range 2 12 would have address values from 0x01000000 to 0xFFFFFFFF but would not have DRAM responding to those addresses. Those skilled in the art will realize that other memory address space partitioning configurations are possible.

In addition to the shared system bus 6, processor A 2 is coupled to a private bus 14, RAM 16, ROM 18, and other attached devices 20, 22 such as Local Area Network attachments or other special-purpose finite state machines. These devices 16, 18, 20, 22 are private to processor A 2 and can send interrupts to processor A 2 directly through private bus A 14, and a special-purpose processor 24 such as an interrupt controller. The devices 16, 18, 20, 22 can also send interrupts to a bus signal detection mechanism 26 which feeds the interrupts directly to processor A 2 or into the special-purpose processor 24 which feeds them into processor A 2.

Similarly, in addition to using the shared system bus 6, processor B 4 has a dedicated bus 34, RAM 36, ROM 38, and attached devices 40, 42 such as Local Area Network attachments or other special-purpose finite state machines. These devices 36, 38, 40, 42 are private to processor B 4, and can send interrupts to processor B 4 directly through bus B 34, and through a special-purpose processor 44 such as an interrupt controller. The devices 36, 38, 40, 42 can also send interrupts to a bus signaling mechanism 46 which feeds the interrupts directly to processor B 4 or into a special-purpose processor 44 and then into processor B 4.

In an alternate embodiment, bus A 14 may be coupled to the system bus 6. In such a case, bus A 14 would become part of bus 6; and RAM 16 and ROM 18 would become a portion of the shared memory 8. It is also possible that bus B 34 may coupled directly to the system bus 6. In this case, bus B 34 would be part of bus 6. In this instance, RAM 36 and ROM 38 would also be a portion of the shared memory 8. In the preferred embodiment, neither bus A 14 or bus B 34 is coupled to bus 6. This allows processors A 2 and B 4 to comprise independent computing subsystems that coordinate activities via the bus signal detection mechanism 26 coupled to processor A 2 and the bus signal detection mechanism 46 coupled to processor B 4.

Figure 2:
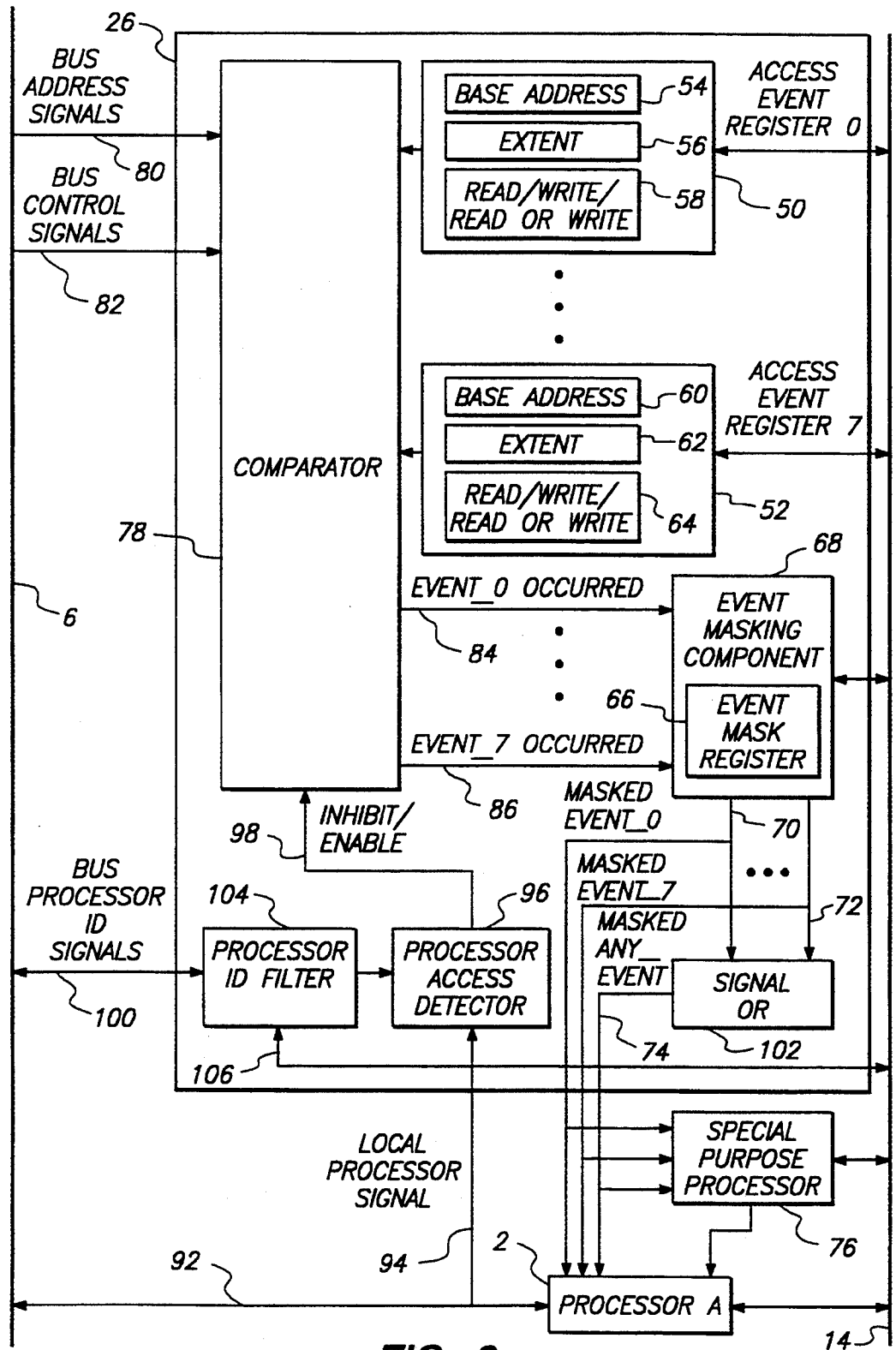
FIG. 2 is a block diagram of a preferred embodiment of the bus signal detection mechanism of the present invention.

Referring now to FIG. 2, a preferred embodiment of the bus signal detection mechanism 26 of the present invention is shown. In the preferred embodiment, the bus signal detection mechanism 26 and processor A 2 are components on the same integrated circuit. Processor A 2 couples the shared system bus 6 and the private bus A 14. Using the shared system bus 6, processor A 2 can access the address space of shared memory 8. The bus signal detection mechanism 26 notifies processor A 2 when processor B 4 accesses specified memory addresses in the address space of shared memory 8. The bus signal detection mechanism 26 preferably comprises a plurality of event registers 50, 52, an event masking component 68, a comparator 78, a processor access detector 96, and a processor ID filter 104

Processor A 2 notifies the bus signal detection mechanism 26 which addresses of the shared memory 8 address space are of interest by loading a plurality of access event registers 50, 52 in the bus signal detection mechanism 26. Processor A 2 uses the private bus 14 to load the access event registers 50, 52. For each access event register 50, 52, the loading process transfers a base address 54, 60, an extent 56, 62, and an access type 58, 64. The base address 54, 60 specifies a starting address of interest within the shared system memory 8 address space. The extent 56, 62 specifies the number of consecutive addresses of interest starting from the base address 54, 60. The access type 58, 64 specifies the type of memory access of interest for the associated base address 54, 60 and extent 56, 62. In the preferred embodiment, access types include read, write, and read/write.

Processor A 2 sets the access event register 50, 52 by writing to the individual access event registers 50, 52 through bus 14 using Input/Output port write operations. Each access event register 50, 52 has a separate Input/Output port address on the private bus 14 in the preferred embodiment. Processor A 2 can also read the access event registers 50, 52. In the preferred embodiment there are eight access event registers 50, 52 although FIG. 2 shows only two as and example.

To reduce access event register 50, 52 circuitry, a hard-wired embodiment eliminates the need for processor A 2 to load base addresses 54, 60, extents 56, 62, and read, write, or read/write 58, 64 information into the access event registers 50, 52. In such an embodiment, all access registers 50, 52 are hard-wired to provide fixed value byte extents 56, 62. For example, the fixed-value byte extents may be wired to a value of 256 bytes, the eight access event registers 50, 52 could have respective hexadecimal hard-wired base addresses of 0x00000000, 0x00000100, 0x00000200, 0x00000300, 0x00000400, 0x00000500, 0x00000600, and 0x00000700. The read, write, or read/write values could also be hard-wired to detect both read and write event accesses. In such a hard-wired embodiment, the collective hard-wiring of the access event registers 50, 52 advantageously provides a significant gate count reduction to detect allowed events. It also reduces the number of gates necessary for the bus signal detection mechanism 26 to distinguish between detected events. When the shared system bus 6 addresses shared memory 8 addresses 0x00000000 through 0x000007FF with either a read or write, a single access event occurs.

Thus, in such an embodiment, the bus signal detection mechanism 26 uses the high-order 21 bit values of the system bus 6 to determine when an access event occurs. The value of all these bits must be zero when an access event is occurring since the shared memory addresses associated with access events is in the area of memory 8 with low-value addresses.

Next, the bus signal detection 26 mechanism determines what event is occurring using the comparator 78. The comparator 78 is coupled to the system bus 6 to receive the bus control signals 82 and the bus address signals 80. The comparator 78 is also coupled to output of the access event registers 50, 52. The bus signal detection mechanism 26 uses the low-order eleven bit-values of the system bus 6 address control signal to distinguish what specific access event is occurring. The three high-order bits of the eleven-low order bits provide the bus signal detection mechanism 26 to determine what event is occurring. The permissible binary bit values for these three shared system bus 6 bits are "000", "001", "010", "011", "100", "101", "110", "111" and reflect the occurrence of access events 0, 1, 2, 3, 4, 5, 6, and 7 respectively for the hard-wired embodiment. For example, a read access for address 0x00000000 is equivalent to a read access for address 0x000000FF as well as any address value between those two addresses. Any such an access results in the "event_0 occurred" signal 84 indicating the occurrence of access event zero. Because the read/write value 58 is also hard-wired to detect both reads and writes, a read access for address of 0x00000000 is also equivalent to a write access for address 0x000000FF or any address value in between those two addresses; and both will generate a event_0 occurred signal.

In the hard-wired embodiment, base address values, extent values, and read/write values are hard-wired to minimize gate counts. Other implementations allow base address values 54, 60, extent values 56, 62, and read/write/read or write 58, 64 values to be loaded into registers. Other embodiments could specify a beginning address and a stopping address or use a variety of other strategies to detect accesses within various address ranges. Finally, the plurality of address ranges specified by the access event registers 50, 52 may overlap or be mutually exclusive as they are in the preferred embodiment. These varying approaches trade gate counts and circuit complexity for operational flexibility and represent a sample of different possible different embodiments.

FIG. 2 also shows and event masking component 68 including the event mask register 66. The event masking component 68 is preferably coupled to bus A 14 and to the comparator 78 to receive the event occurred signals. Before loading the access event register 50, 52, processor A 2 loads the event mask register 66 within the event masking component 68. Since there are eight access event registers 50, 52 in the preferred embodiment, an eight bit value suffices as a suitable mask, one bit for each access event register 50, 52. Bit zero in the event mask register 66 corresponds to access register zero, and bit one in the event mask register 66 corresponds to access register one. The other six event mask circuitry is not displayed for simplicity. If an event mask register 66 bit has a zero value, then the event masking component 68 prevents a masked event signal 70, 72 from indicating the comparator 78 has detected the event specified by the associated access event register 50, 52. The outputs of the event masking component 68 are coupled to the special purpose processor 24 and processor A 2. The plurality of masked event signals 70, 72 can feed processor A 2 directly and/or another special-purpose processor 24 or a component that counts the event occurrences and emits a single signal when a threshold count is achieved. The outputs of the event masking component 68 are also provided to OR logic 102. OR logic 102 combines the masked event signals 70, 72 into a composite signal which either feeds processor A 2 directly or a special-purpose processor 24. In the preferred embodiment, the masked and combined event signals 70, 72, 74 directly feed a special-purpose processor 76 which couples to processor A 2.

As shown in FIG. 2, the comparator 78 couples to the shared system bus 6 and receives the bus address signals 80 and bus control signals 82. The bus address signals 80 indicate what shared memory 8 address is being referenced. The bus control signals 82 indicate whether the access is a read access or a write access. In the preferred embodiment, there are no shared system bus 6 signals 100 indicating what processor 2, 4 is performing the access, though the bus 6 could provide this signal.

As the bus signal detection mechanism 26 receives bus address signals 80 and bus control signals 82, the comparator 78 decodes them and simultaneously compares the result to criteria 54, 56, 58, 60, 62, 64 stored in the plurality of access event registers 50, 52. When the comparator 78 detects a valid address and access-type (read/write/read or write) event, it emits a corresponding event-occurred signal for the event 84, 86 to the event masking component 68. Because event access registers 50, 52 may specify overlapping address ranges, a single address access on the shared system bus 6 can simultaneously result in more than one event-occurred 84, 86 signal.

To prevent unwanted event notifications to processor A 2 that might occur when processor A 2 itself accesses the shared memory 8, the processor access detector 96 couples to a local processor signal 94 from processor A 2 and shared system bus 6. This allows the processor access detector 96 to generate an inhibit signal 98 sent to the comparator 78. The bus signal detection mechanism 26 ignores access events that occur while the inhibit signal 98 is TRUE. Processor A 2 could optionally disable the processor access detector 96 by a variety of well known methods. This would allow multi-processing program threads under processor A's control to generate events that other program threads under processor A's control respond to. Also, if the shared system bus 6 provides bus processor ID signals 100 that indicate which processor 2, 4 is generating the access on the shared system bus 6, that signal 100 could feed the processor access detector 96 directly, precluding the need for other local bus signals such as the local processor signal 94.

Alternately, the bus processor ID signals could feed the processor ID filter 104. Using well known techniques, processor A 2 could load the processor ID filter 104 with processor ID values that are or are not of interest to Processor A 2. The output from this logic 104 would feed the processor access detector 96. Matching processor IDs with access event register criteria would allow the shared bus signal detection detection mechanism 26 an increased discrimination capability.

Figure 3:
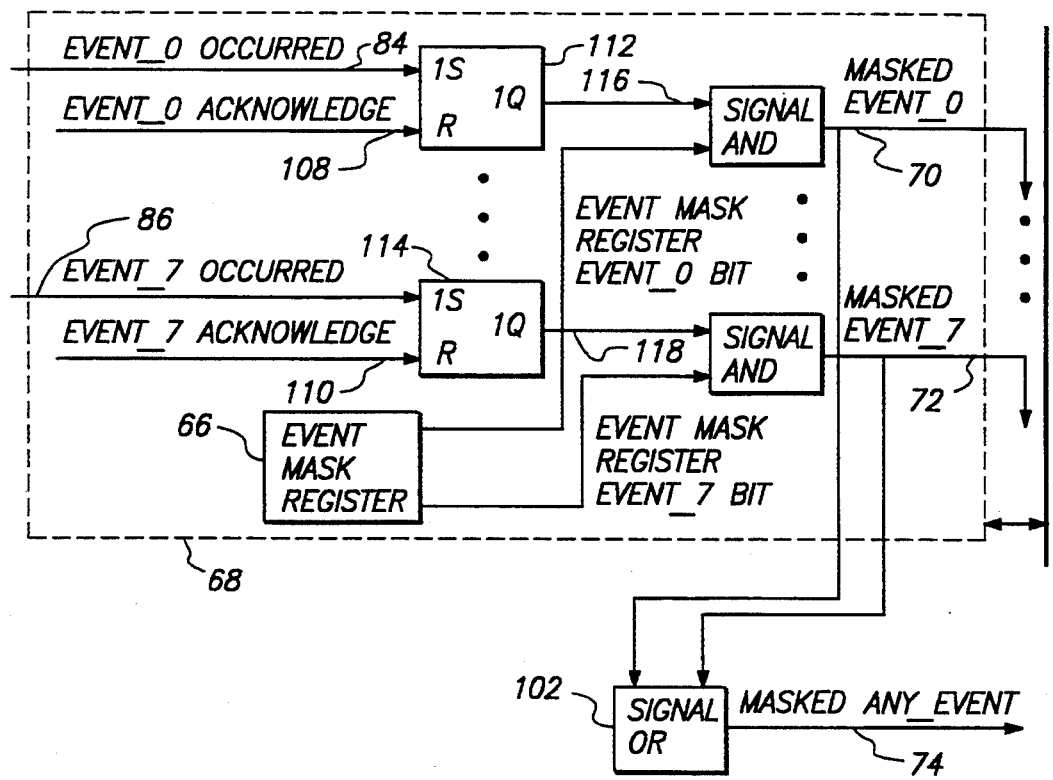
FIG. 3 is a schematic diagram of the event masking component of the present invention.

FIG. 3 illustrates a preferred embodiment for the event masking component 68 and how it allows processor A 2 to mask off unwanted or spurious event signals. Processor A 2 uses the private bus A 14 to load the event mask register 66 with an I/O port operation. On each clock cycle, individual event signals 84, 86 feed into individual set/reset flip-flop circuits 112, 114 that also receive event acknowledge signals 108, 110 from processor A 2. The event acknowledge signals 108, 110 allow processor A 2 to subsequently respond to events that occur while processing a previous event of the same type. The flip-flop output signals 116, 118 are individually ANDed with bit value signals from the event mask register 66. The result of these AND operations generate the masked event signals 70, 72. ORing 102 the masked event signals 70, 72 together generates the masked any-event signal 74.

Figure 4:
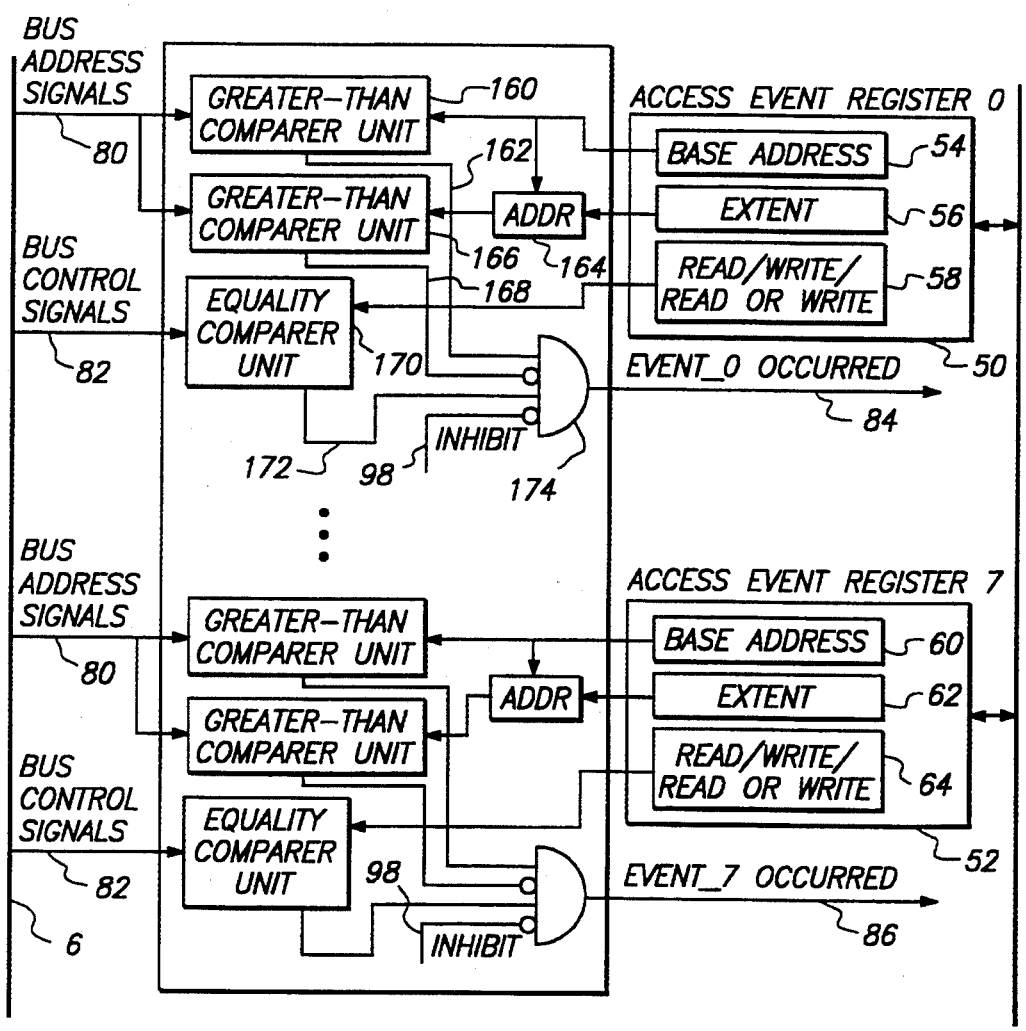
FIG. 4 is a block diagram of the construction of the comparator component of the present invention.

FIG. 4 illustrates a preferred embodiment of the comparator 78. FIG. 4 only illustrates the comparator's construction for supporting two of the eight event access registers, however, those skilled in the art will understand that similar circuitry is provided for each access event. In FIG. 4, a greater-than comparer unit 160 receives base address information from the base register 54 of access event register 0 50 as well as bus address signals 80 from bus 6. When the bus address value exceeds the value from base register 54, signal 162 becomes TRUE. Otherwise, signal 162 is FALSE.

Simultaneously, the value of base register 54 of the access event register 0 50 is fed to adder 164. Adder 164 also receives the value in access event register 0 50 extent register 56. Adder 164 adds these two values and provides the sum to a greater-than comparer unit 166. Greater-than comparer unit 166 receives this value as well as the bus address signals 80 that are simultaneously fed to greater-than comparer 160. When the bus address value exceeds the sum of the access event register 0 50 extent register 56 value plus the base register 54 value, signal 168 becomes TRUE. Otherwise it is FALSE.

Equality comparer unit 170 receives the access event register 0 50 read, write or read/write settings and compares them to the bus control signals 82. If there is a match, signal 172 becomes TRUE. Otherwise, it is FALSE. Signals 162, 168, 172, and 98 are ANDed together by AND gate 174. Before ANDing, signal 168 is inverted to produce a TRUE signal when the bus address value is less than or equal to the value produced by adder 164. The AND gate 174 also receives an inhibit signal 98 from the processor access detector 96 which allows for selective enabling of the comparator 78. If only TRUE signals are currently being ANDed together by AND gate 174, then signal 84 is TRUE indicating access event 0occurred. Otherwise, signal 84 is FALSE. Similar logic supports the other seven access event registers in the preferred embodiment.

Figure 5:
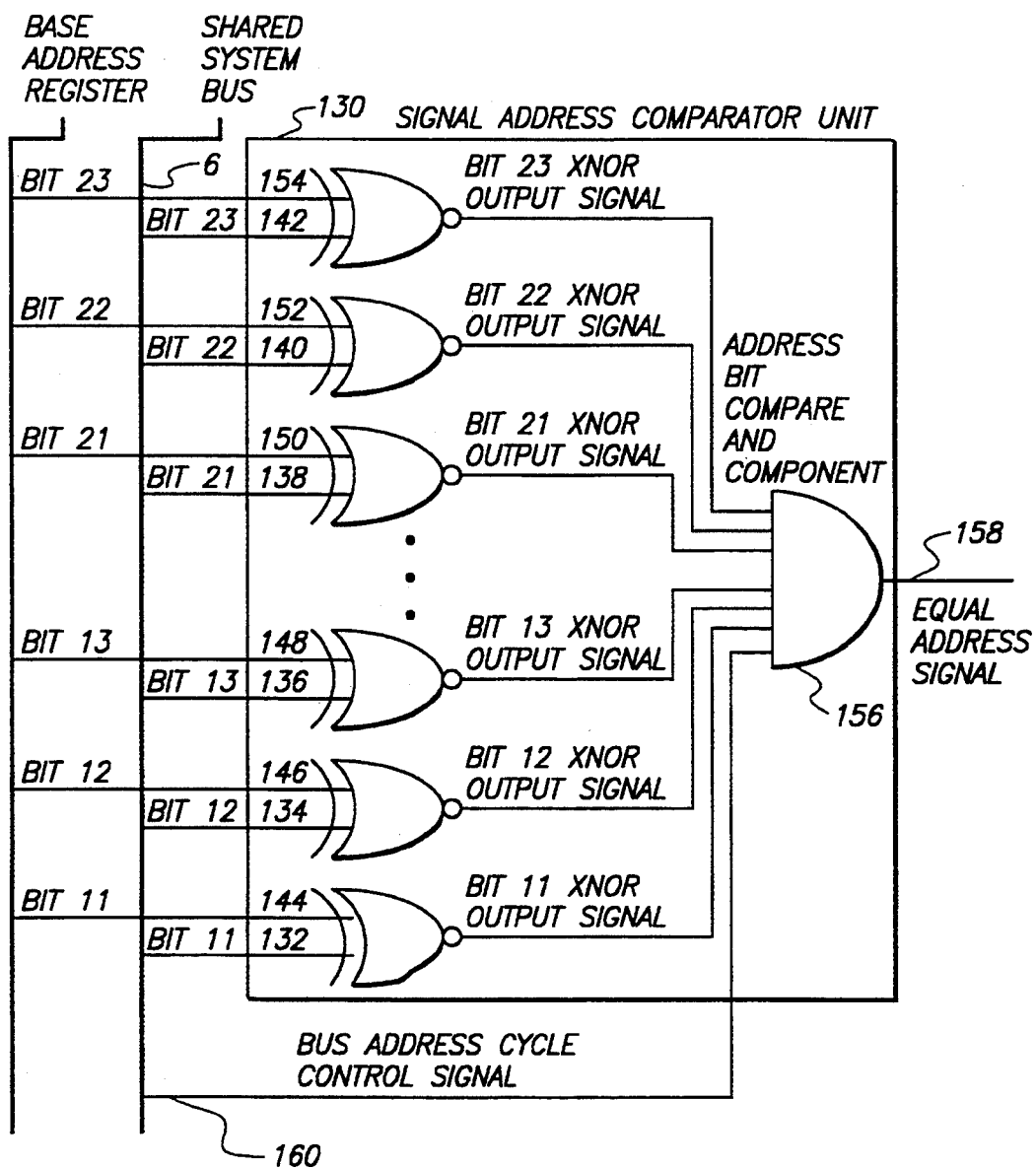
FIG. 5 is a block diagram of the single address comparator unit of the present invention.

FIG. 5 illustrates one embodiment for the comparator 78 where the access event registers 50, 52 are hard-wired as previously described. In other possible embodiments, each access event register may require a dedicated comparator unit to detect access events as described in FIG. 4. Each comparator 78 would examine shared system bus address 6 accesses based on information provided by the access event registers 50, 52. When dedicated comparators 78 detect an access event, they would emit the appropriate event occurred 84, 86 signal.

In the hard-wired embodiment, there are eight base address registers 54, 60 and their high-order 21 bit values are hard-wired to have values of zero. Moreover, the hard-wired base addresses and non-overlapping 256 byte extents collectively reside within and consume the shared system memory address range of 0x00000000 through 0x000007FF. These hard-wired embodiment provisions reduce the gate count and allow a single address comparator unit 130 to detect all events.

The single address comparator unit 130 receives shared system bus 6 bit values 11 through 23 132, 134, 136, 138, 140, and 142. These bit values are individually XNORed (exclusively-ored and the output is inverted) with bit values 11 through 23 144, 146, 148, 150, 152, and 154 respectively from any base address register 50, 52. The hard-wired value of all these base address register 50, 52 bits is zero in the hard-wired embodiment.

The individual XNOR output signals indicate whether two signals are identical. If two signals are identical, the output signal is TRUE, otherwise it is FALSE. To determine whether a plurality of XNOR output signals are all TRUE, they are collectively fed to an address bit compare AND component 156. The output signal from the address bit compare AND component 156 is the equal address signal 158. When this signal is TRUE, the hard-wired embodiment single address comparator unit 130 has detected an access event. The precise hard-wired implementation of the address bit compare AND component 156 varies depending on the particular VLSI technology used.

In FIG. 5, the shared system bus 6 bus address cycle control signal 160 is also received by AND gate 156 along with the plurality of XNOR output signals to generate the equal address signal 158. For the equal address signal 158 to be TRUE, all compared address bits must be equal and a shared system bus 6 address cycle must be occurring.

Finally, the single comparator unit 130 does not need to examine the shared system bus 6 read/write control signals to detect an access event in the hard-wired embodiment. In the hard-wired embodiment, there is no provision to load read/write/read or write register 58, 64 values. The bus signal detection mechanism 26 is hard-wired to accept either a read or a write. Thus, there is no requirement to examine these bus control signals in the hard-wired embodiment. However, adding this feature is straight forward. In the case where the bus indicates a specific access type with a TRUE signal, adding the feature consists of ANDing together the read/write/read or write register 58, 64 with the respective bus read/write control signals and the bus address control signal. The result of the AND operations are ORed together to generate a TRUE signal when an appropriate access mode occurred.

Figure 6:
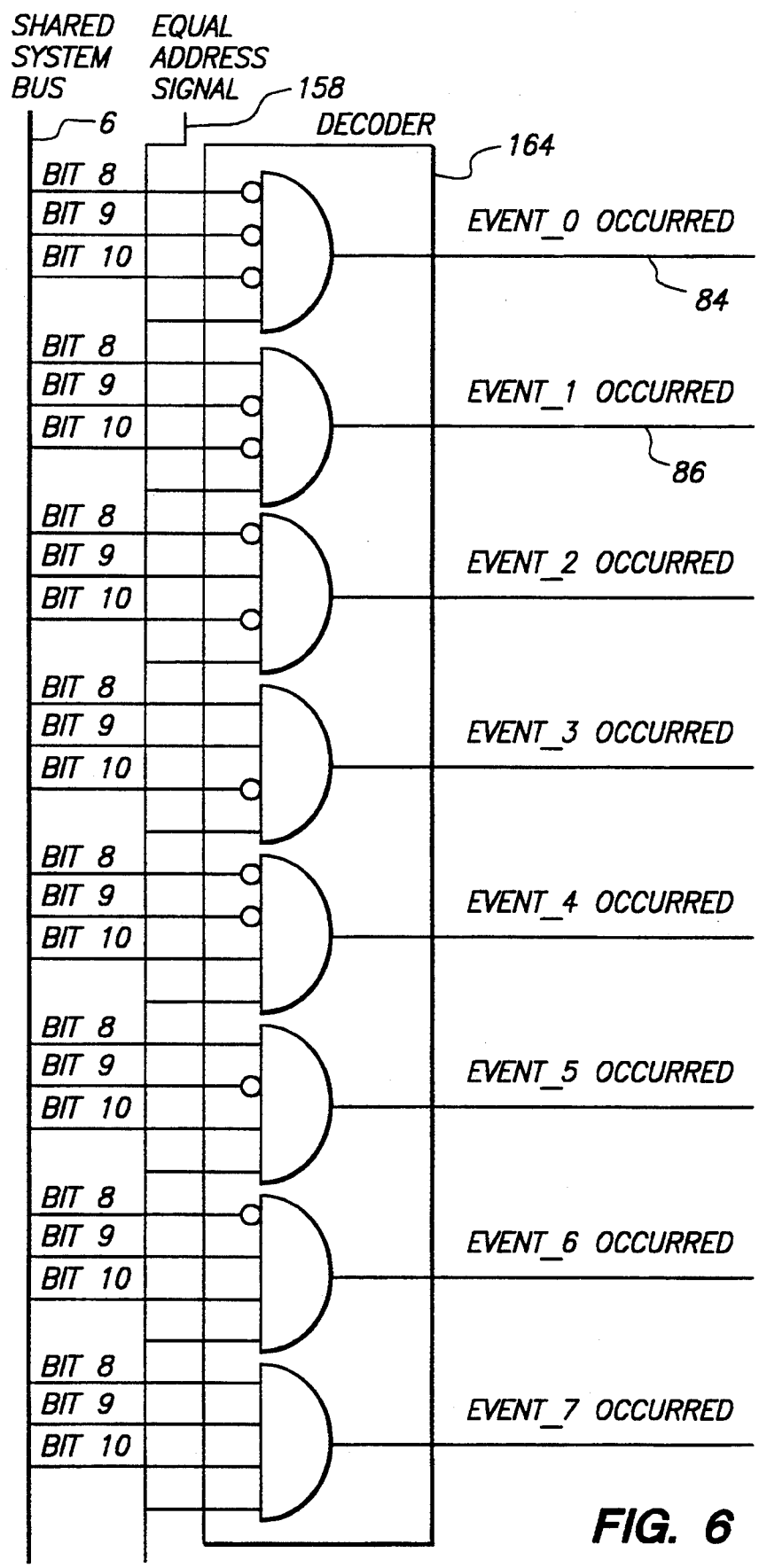
FIG. 6 is a block diagram of the event decoder of the present invention.

FIG. 6 illustrates a decoder 164 used by the hard-wired comparator 78 to determine which access event occurred. The decoder 164 receives shared system bus 6 address signals for bits 8, 9, and 10 where bit zero is the low-order bit of any shared system address. By appropriately inverting these signals and ANDing the results with the equal address signal 158, appropriate event occurred signals 84, 86 become TRUE when address access events occur. This process identifies which 256 byte shared system memory address range (zero through seven) was selected for reading or writing by a processor.

Figure 7:
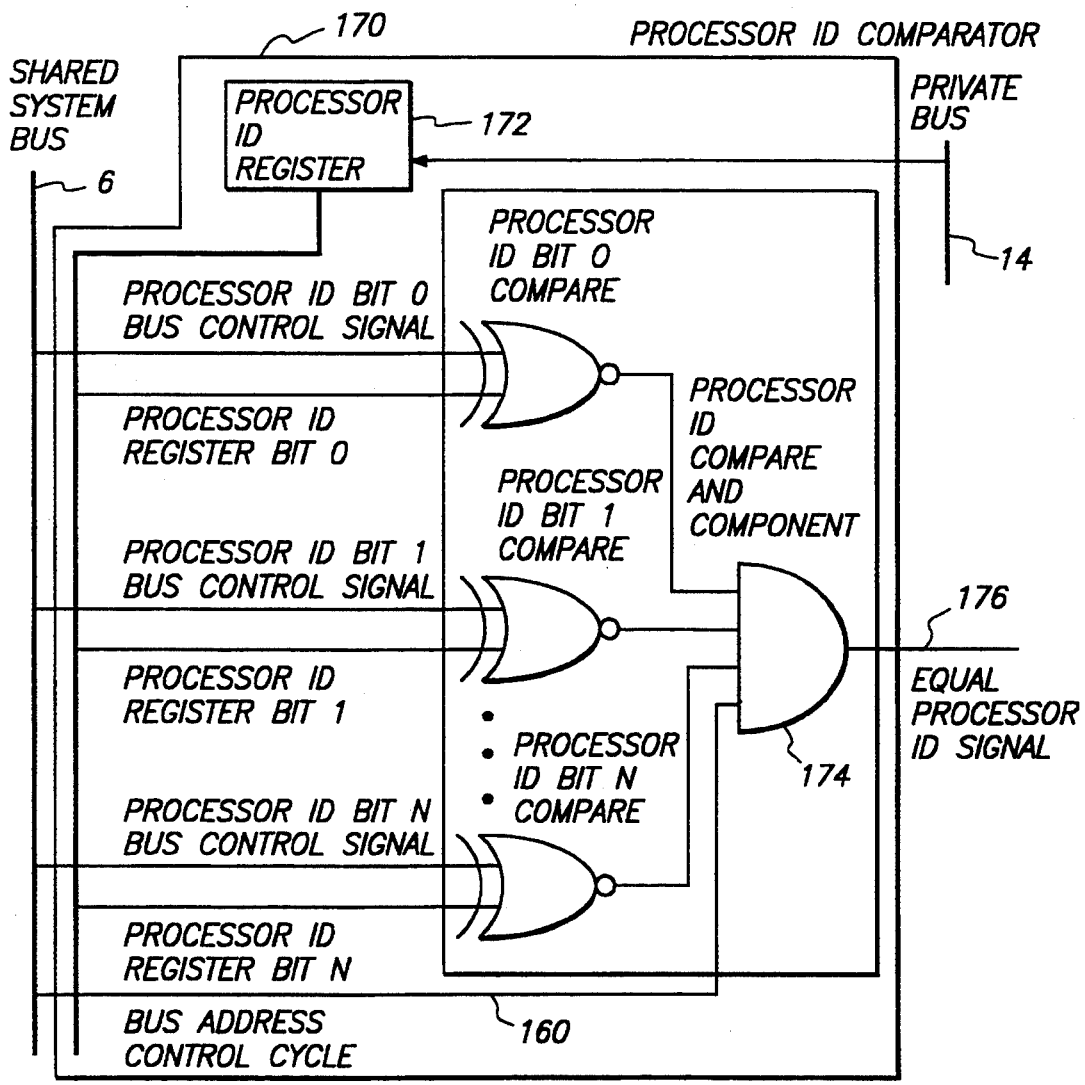
FIG. 7 is a block diagram of the processor ID comparator of the present invention.

FIG. 7 illustrates a preferred embodiment of the processor ID comparator 170. It assumes the shared system bus 6 provides processor ID signals that identify what processor 2, 4 is accessing shared memory 8. In FIG. 7, processor A 2 loads a processor ID register 172 using an private bus 14 Input/Output load operation. The value loaded into a processor ID register 172 identifies a processor that should generate access events for processor A 2. Similar to the process illustrated in FIG. 5, the shared system bus 6 processor ID signals are bitwise compared to the processor ID register values using XNOR operations. The processor ID compare AND component 174 ANDs the outputs from these XNOR operations with the shared system bus 6 bus address cycle control signal to generate an equal processor ID signal 176.

Figure 8:
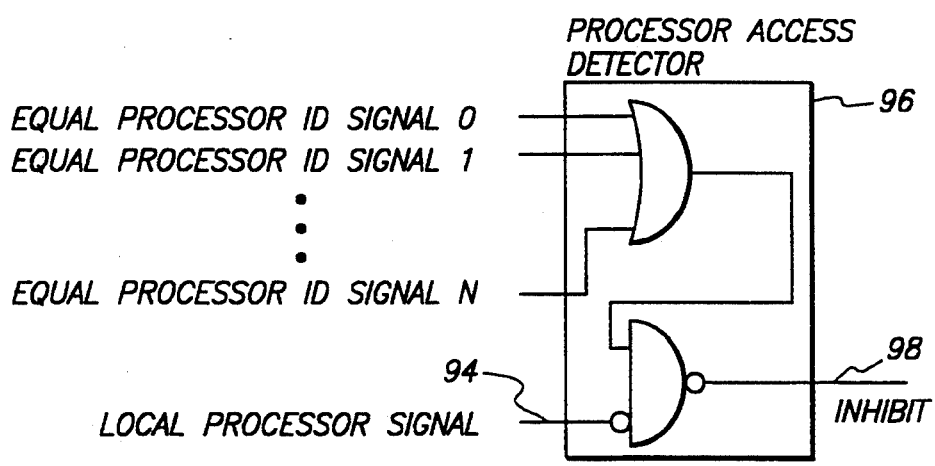
FIG. 8 is a block diagram of the processor access detector of the present invention.

FIG. 8 illustrates the process of ORing together a plurality of equal processor ID signals 176 to generate the inhibit signal 98. The plurality of process ID comparators 170 could reside within the processor ID filter 104 or within the processor access detector 96 if it receives shared system bus 6 processor ID control signals. In the hard-wired embodiment, the plurality of processor ID comparators reside in the processor ID filter 104 and the processor access detector 96 comprises the OR circuitry that combines the various equal processor ID signals 176.

In typical work queues, queue manipulation is performed under software control. One processor, the producing processor, periodically places queue elements in a memory that a second, the consuming processor, examines and processes. Both processors perform their tasks under software control and independently access the shared memory via a shared bus or use dual-ported memory. In the case of systems with more than two processors, some processors may only have queue read privileges, while others have read and write privileges. In the case of systems with a single processor, the consuming and producing processor are the same processor and the memory is accessed by a shared, that is the same, bus.

Queue elements often represent an atomic processing unit that the consuming processor, must provide. Obviously, consuming processors must be aware queue elements exist in their queues before they can processes them. Therefore, one generally-applied approach requires consumer processors periodically to check shared-memory queues for work unit elements. This checking squanders consumer processor power when no elements exist and the processor has other work to perform.

In an alternate generally-applied approach, the producer processor may send interrupt signals to the consumer processor. Such interrupts are considered disruptive, processor-intensive activities because they first require the consuming processor to stop its current activities, perform some work such as copying data (i.e., save state) in response to the interrupt, and resume the prior activities. High interrupt rates can completely consume general-purpose processors, leaving them unable to perform other activities. Similar considerations apply to the semaphore signalling and synchronization approach. Thus, the present invention advantageously overcomes these processing limitations with the bus signal detection mechanism that automatically monitors for activity in definable sections of memory.

It should be understood to those skilled in the art that many modifications may be made to the present invention and that the preferred embodiments described above are provided only by way of example. Such modifications fall within the true spirit and scope of the present invention which is only limited by the claims.

What is claimed is:

1. In a system comprising a plurality of processors coupled together by a shared bus, said processors having access to a shared address space in a shared memory, said system for detecting access to a selected portion of said shared address space by at least one of said processors, said system comprising:
    an event register, coupled to at least one of said processors, for receiving and storing a base address, an extent, and an access type signal from at least one of said plurality of processors; and
    a comparator coupled to said shared bus for receiving a bus address and a bus control signal from one of said processors, and coupled to said event register for receiving said base address, extent, and access type signal, said comparator deriving an upper address based on said base address and said extent, said comparator comparing said bus address to said base and upper addresses to determine whether said bus address is equal to or between said base and upper addresses, and comparing said bus control signal to said access type signal to determine logical equivalency, said comparator sending an event notification signal on an output coupled to at least one of said processors if said bus address is equal to or between said base and upper addresses, and if said bus control signal is logically equivalent to said access type signal.

2. The apparatus of claim 1, further comprising a processor access detector coupled to said shared bus for receiving a processor identification therefrom, said detector disabling the comparator when a particular processor is sending signals on said shared bus.

3. The apparatus of claim 1, wherein the comparator comprises:
    a first greater than comparator coupled to the shared bus and to the event register for receiving and comparing said bus address to said base address, and providing an output;
    an adder coupled to the event register for receiving and adding said extent to said base address to derive said upper address;

a second greater than comparator coupled to the shared bus and to the adder for receiving and comparing said bus address to said upper address, and providing an output;

an equality comparator coupled to the shared bus and the event register for receiving and comparing said bus control signal to said access type signal, and providing an output; and an AND gate having inputs coupled to the output of the first greater than comparator, the second greater than comparator and the equality comparator, and an output coupled to at least one of said processors.

4. The apparatus of claim 1, wherein the output of the comparator is also coupled to a specialized processor.

5. The apparatus of claim 1, further comprising a second event register coupled to at least one of said processors for receiving and storing a second base address, a second extent and a second access type signal, and coupled to the comparator, wherein the comparator derives a second upper address based on said second base address and said second extent, said comparator comparing said bus address to said second base and second upper addresses to determine whether said bus address is equal to or between said second base and second upper addresses, and comparing said bus control signal to said second access type signal to determine logical equivalency, said comparator sending a second event notification signal on a second output coupled to at least one of said processors if said bus address is equal to or between said second base and second upper addresses, and if said bus control signal is logically equivalent to said second access type signal.

6. The apparatus of claim 5, further comprising an event masking component coupled to the outputs of the comparator for selectively masking off unwanted event notification signals.

7. The apparatus of claim 6, wherein the event masking component comprises:

a masking register coupled to at least one of said processors for storing a plurality of masking bits;

a plurality of flip-flops each having an input coupled to an output of the comparator, and an output; and a plurality of AND gates each having inputs and an output, each AND gate having one input coupled to the output of the mask register and a second input coupled to the output of one of the flip-flops, the outputs of the AND gates providing masked event signals.

8. The apparatus of claim 7, further comprising an OR gate having inputs coupled to the outputs of the AND gates, and the output to at least one of said processors for providing and "any event" signal thereto.

9. The apparatus of claim 1, wherein the event register is coupled to at least one of said processors via a local bus.

10. In a system comprising a plurality of processors coupled together by a shared bus, said processors having access to a shared address space in a shared memory, said system for detecting access to a selected portion of said shared address space by at least one of said processors, said system comprising:

address means for providing a base address, extent, and an activity type signal; and a comparator coupled to said shared bus for receiving a bus address and an access type signal from one of said processors, and coupled to said address means for receiving said base address, extent and activity type signal, said comparator deriving an upper address based on said base address and said extent, said comparator comparing said bus address to said base and upper addresses to determine whether said bus address is equal to or between said base and upper addresses, said comparator sending an event notification signal on an output coupled to at least one of said processors if said bus address is equal to or between said base and upper addresses, and if said access type signal is logically equivalent to said activity type signal.

11. The apparatus of claim 10, further comprising a processor access detector coupled to said shared bus for receiving a processor identification therefrom, said dectector disabling the comparator when a particular processor is sending signals on said shared bus.

12. The apparatus of claim 10, wherein the comparator comprises:

a first greater than comparator coupled to the shared bus and the address means for comparing said bus address to said base address, and providing an output;

an adder coupled to the address means for receiving and adding the base address to the extent to derive said upper address;

a second greater than comparator coupled to the shared bus and the adder for receiving and comparing the bus address to said upper address, and providing an output;

an equality comparator coupled to said shared bus and the address means for comparing the access type signal received from the shared bus to the activity type signal from the address means, and providing an output; and an AND gate having inputs coupled to the output of the first greater than comparator, the second greater than comparator and the equality comparator, and an output coupled to at least one of said processors.

13. The apparatus of claim 10, further comprising a second address means for providing a second base address, a second extent, and an activity type signal to the comparator, wherein the comparator compares the address and the access type signal on the shared bus, which address and the access type signal are received from one of said plurality of processors, to the address, second extent, and activity type signal from said second address means to provide a second event notification signal on the comparator output, derives a second upper address based on said second base address and said second extent, said comparator comparing said bus address to said second base and second upper addresses to determine whether said bus address is equal to or between said second base and second upper addresses, said comparator sending a second event notification signal on a second output coupled to at least one of said processors if said bus address is equal to or between said second base and second upper addresses, and if said access type signal is logically equivalent to said activity type signal.

14. The apparatus of claim 13, further comprising an event masking component coupled to the outputs of the comparator for selectively masking off unwanted event notification signals.

15. The apparatus of claim 14, wherein the event masking component comprises:

a mask register for storing a plurality of masking bits;

a plurality of flip-flops each having an input coupled to an output of the comparator, and an output; and a plurality of AND gates each having inputs and an output, each AND gate having one input coupled to an output of the mask register and a second input coupled to the output of one of the flip-flops, the outputs of the AND gates providing masked event signals.

16. The apparatus of claim 15, further comprising an OR gate having inputs coupled to the outputs of the AND gates and an output coupled to at least one of said processors for providing an "any event" thereto.

17. The apparatus of claim 10, wherein the output of the comparator is also coupled to a specialized processor.

18. In a system comprising a plurality of processors coupled together by a shared bus, said processors having access to a shared address space in a shared memory, a method for detecting access to a selected portion of said shared address space by at least one of said processors, said method comprising the steps of:

receiving a bus address and an access-type signal sent by one of said processors on said shared bus;

receiving a base address, an extent and an access-type signal from an address source;

deriving an upper address based on said base address and said extent;

comparing said bus address to said base address and said upper address to determine whether said bus address is equal to or between said base and upper addresses;

comparing said access-type signal received from the shared bus to the access-type signal from the address source to determine logical equivalency; and providing an event notification signal to at least one of said processors if said bus address is equal to or between said base and upper addresses, and if said access-type signal received from the shared bus is logically equivalent to the access-type signal from the address source.

19. In a system comprising a plurality of processors coupled together by a shared bus, said processors having access to a shared address space in a shared memory, a method for detecting access to a selected portion of said shared address space by at least one of said processors, said method comprising the steps of:

receiving a bus address and a bus control signal sent by one of said processors on said shared bus;

receiving a base address, an extent, and an access type signal from an address source;

deriving an upper address based on said base address and said extent;

comparing said bus address to said base address and said upper address to determine whether said bus address is equal to or between said base and upper addresses;

comparing said bus control signal to said access type signal to determine logical equivalency; and providing an event notification signal to at least one of said processors if said bus address is equal to or between said base and upper addresses, and if said bus control signal is logically equivalent to said access type signal.

* * * * *